(12) United States Patent
Liu et al.

(10) Patent No.: US 12,591,762 B2
(45) Date of Patent: Mar. 31, 2026

(54) METHOD, SYSTEM FOR ODOR VISUAL EXPRESSION BASED ON ELECTRONIC NOSE TECHNOLOGY, AND STORAGE MEDIUM

(71) Applicant: CHINA ACADEMY OF ART, Hangzhou (CN)

(72) Inventors: Zheng Liu, Hangzhou (CN); Xudai Long, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 740 days.

(21) Appl. No.: 17/990,375

(22) Filed: Nov. 18, 2022

(65) Prior Publication Data
US 2023/0162002 A1     May 25, 2023

(30) Foreign Application Priority Data
Nov. 23, 2021     (CN) .......................... 202111397456.2

(51) Int. Cl.
| | |
|---|---|
| *G06N 3/042* | (2023.01) |
| *G06F 16/28* | (2019.01) |
| *G06N 3/048* | (2023.01) |
| *G06N 3/084* | (2023.01) |

(52) U.S. Cl.
CPC ........... *G06N 3/042* (2023.01); *G06F 16/287* (2019.01); *G06N 3/048* (2023.01); *G06N 3/084* (2013.01)

(58) Field of Classification Search
None
See application file for complete search history.

(56) References Cited

U.S. PATENT DOCUMENTS

| | | | |
|---|---|---|---|
| 2012/0143804 A1* | 6/2012 | Haddad .................. | G06N 20/00 706/20 |
| 2017/0243113 A1* | 8/2017 | Fukuda .................. | G06N 3/045 |

(Continued)

OTHER PUBLICATIONS

Rugard, Marylène, et al. "Smell compounds classification using UMAP to increase knowledge of odors and molecular structures linkages." PloS one 16.5 (2021): e0252486. (Year: 2021).*

(Continued)

*Primary Examiner* — Eric Nilsson
(74) *Attorney, Agent, or Firm* — MUNCY, GEISSLER, OLDS & LOWE, P.C.

(57)     ABSTRACT

A method and system for odor visual expression based on electronic nose technology, and a storage medium are disclosed. The method includes: acquiring category information of an odor to be identified based on the electronic nose technology; determining demand information of the odor to be identified according to the category information; collecting corresponding relevant data according to the demand information so as to construct a database; constructing a knowledge map centered on odor identification according to the database; and converting the structured knowledge map into a visual node-link graph. The method and system for odor visual expression based on electronic nose technology and the storage medium according to this disclosure present related information of the identified odor to users in a form of visual content, and the visual content can facilitate the users to have more intuitive understanding of odors.

5 Claims, 1 Drawing Sheet

(56)    References Cited

U.S. PATENT DOCUMENTS

| | | | |
|---|---|---|---|
| 2020/0302825 A1* | 9/2020 | Sachs | H04N 21/472 |
| 2021/0144110 A1* | 5/2021 | Tseng | H04L 51/02 |

OTHER PUBLICATIONS

Lehr, Bernard Widrow Michael A. "Backpropagation and its Applications." <https://www-isl.stanford.edu/~widrow/papers/c1992backpropagationand.pdf>. (1992). (Year: 1992).*

Sharma, Anju, et al. "SMILES to smell: decoding the structure-odor relationship of chemical compounds using the deep neural network approach." Journal of Chemical Information and Modeling 61.2 (2021): 676-688. (Year: 2021).*

Jong, Gwo-Jia, et al. "A novel feature extraction method an electronic nose for aroma classification." IEEE Sensors Journal 19.22 (2019): 10796-10803. (Year: 2019).*

* cited by examiner

METHOD, SYSTEM FOR ODOR VISUAL EXPRESSION BASED ON ELECTRONIC NOSE TECHNOLOGY, AND STORAGE MEDIUM

TECHNICAL FIELD

The disclosure belongs to the technical field of odor visualization, and particularly relates to a method and system for odor visual expression based on electronic nose technology, and to a storage medium.

BACKGROUND ART

Experience economy mainly involving five senses has become one of current developing trends, in which Olfaction is playing an increasingly important role. Odor can subtly influence consumer behavior and improve users' experience of products. In related art, with development and popularization of electronic sensory technology, complex gases can be detected and identified, and basic information on gas categories and components is more scientific and accurate. However, traditional display of category information identified on odors can only be quickly understood by professionals, which depends on professional knowledge and experience. It is difficult for ordinary people to know the odors by name, with poor versatility and heavy workload.

Therefore, it is necessary to use computer technology, artificial intelligence technology, or other technologies to design and process identified odor information and generate a comprehensive and easy-to-understand visualization information report. In the related art, only characteristics of the odors are acquired after recognition, and related information such as related applications and imagery descriptions of the odors are not completely and clearly displayed. Existing recognition and acquisition of the odors is only a field involved by relevant researchers, and it is difficult for other professionals to grasp related comprehensive information of odors in a short time, and it is impossible for the related art to display more intuitively and comprehensively.

SUMMARY

A method and system for odor visual expression based on electronic nose technology, and a storage medium are provided in the disclosure, which adopt following technical schemes.

A method for odor visual expression based on electronic nose technology includes following steps.

acquiring category information of an odor to be identified based on the electronic nose technology;

determining demand information of the odor to be identified according to the category information;

collecting corresponding relevant data according to the demand information so as to construct a database;

constructing a knowledge map centered on odor identification according to the database; and converting the structured knowledge map into a visual node-link graph.

Further, the category information refers to a category that a trained model predicts the odor belongs to in pattern recognition or a category with optimal matching in a trained data set.

Further, the category information refers to a category that the trained model predicts it belongs to in the pattern recognition.

Acquiring category information of the odor to be identified based on the electronic nose technology specifically includes:

collecting a number of different odor sample data to form a covariance matrix with n rows and m columns, where n is a dimension of the collected data and m is a number of odor samples;

calculating eigenvalues and eigenvectors of the covariance matrix;

selecting eigenvectors of q dimensions with largest eigenvalues to form a projection matrix of q rows and m columns;

training a classification model with data features obtained by multiplying each odor feature by the projection matrix; and collecting data of the odor to be identified so as to be input into the trained classification model to obtain the category information.

Further, the classification model is a BP ANN model.

Further, training the classification model specifically includes:

setting weights and thresholds between different layers of the BP ANN model as a random floating-point number between −1.0 and 1.0;

calculating an error between an output value of an output layer node and a target value by using derivative of a Sigmoid function; and correcting weights between nodes in respective layers and thresholds of nodes in a hidden layer and the output layer according to Widrow and Hoff correction learning rules until the BP ANN reaches a fitted state.

Further, a value of n is 8, and a value of q is 3.

Further, collecting corresponding relevant data according to the demand information so as to construct the database specifically includes:

crawling network data based on nutch theme information;

processing crawled network data so as to obtain target information; and saving the calculated target information to form a database.

Further, processing crawled network data so as to obtain the target information specifically includes:

calculating the crawled network data with a CTPN text detection algorithm, a CRNN text recognition algorithm and a SSD image detection algorithm so as to get the target information.

A system for odor visual expression based on electronic nose technology includes a data classification unit, an information determination unit, a data acquisition unit, a generating unit and a conversion unit.

The data classification unit is configured to acquire category information of an odor to be identified based on the electronic nose technology.

The information determination unit is configured to determine demand information of the odor to be identified according to the category information.

The data acquisition unit is configured to collect corresponding relevant data according to the demand information so as to construct a database.

The generating unit is configured to construct a knowledge map centered on odor identification according to the database.

The conversion unit is configured to convert the structured knowledge map into a visual node-link graph.

A computer-readable storage medium with computer instructions stored thereon. The computer instructions, when executed by a processor, can implement any of the method for odor visual expression based on electronic nose technology.

The disclosure has advantages that the method and system for odor visual expression based on electronic nose technology and the storage medium present related information of the identified odor to users in a form of visual content, and the visual content can facilitate the users to have more intuitive understanding of odors.

The method and system for odor visual expression based on electronic nose technology and the storage medium have advantages that the category information of the odor is obtained by the electronic nose technology, and the demand information is collected by computer crawler technology, which is used for constructing a knowledge map centered on odor identification.

The method and system for odor visual expression based on electronic nose technology and the storage medium also have advantages that natural language technology is adopted to analyze text data of the odor to be identified, and key words in the text of the odor to be identified are summarized, and a database of odor categories can be formed with its own characteristics and related characteristics, including but not limited to gas composition, odor category characteristics, odor descriptors, odor color, odor volatility and the like, so as to construct the knowledge map centered on odor recognition.

DETAILED DESCRIPTION

The disclosure will be described in the following in detail with reference to the drawings and specific embodiments.

Figure 1:
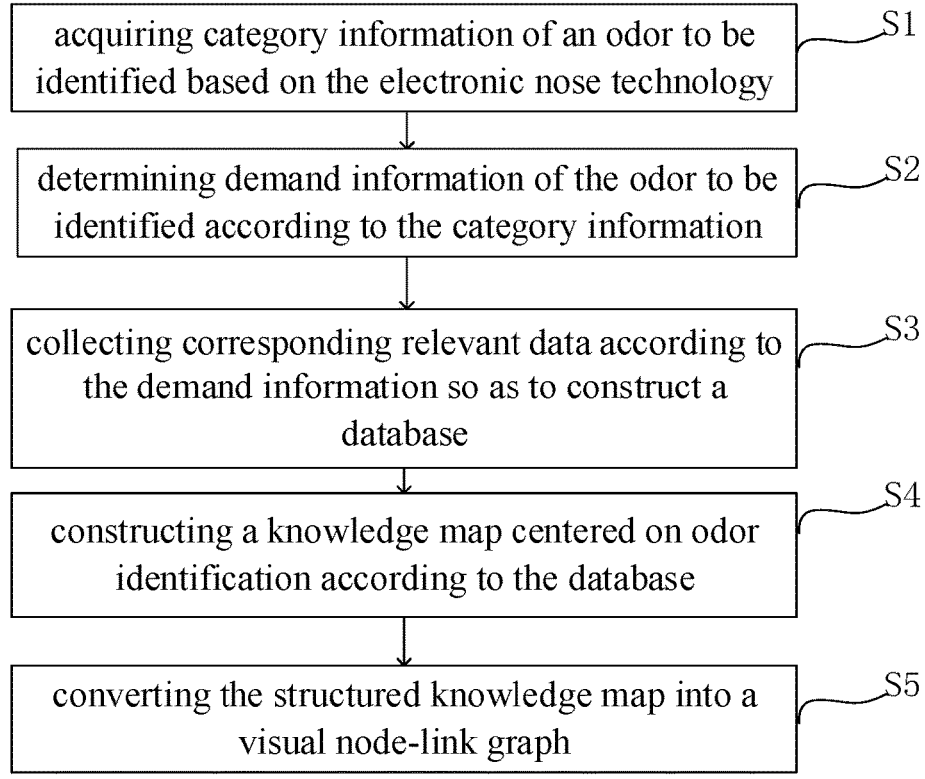
FIG. 1 is a schematic diagram of a method for odor visual expression based on electronic nose technology according to the present disclosure.

FIG. 1 shows a method for odor visual expression based on electronic nose technology in the disclosure, which includes the following steps S1 to S5. In step S1, category information of an odor to be identified is acquired based on the electronic nose technology. In step S2, demand information of the odor to be identified is determined according to the category information. In step S3, corresponding relevant data is collected according to the demand information so as to construct a database. In step S4, a knowledge map centered on odor identification is constructed according to the database. In step S5, the structured knowledge map is converted into a visual node-link graph. The method for odor visual expression based on electronic nose technology present related information of the identified odor to users in a form of visual content, and the visual content can facilitate the users to have more intuitive understanding of odors. The method described above is described in detail below.

For the step S1, the category information of the odor to be identified is acquired based on the electronic nose technology.

It can be understood that the category information refers to a category that a trained model predicts the odor belongs to in pattern recognition or a category with optimal matching in a trained data set.

As a preferred embodiment, the category information refers to a category that the trained model predicts it belongs to in the pattern recognition. A step where the category information of the odor to be identified is acquired based on the electronic nose technology specifically includes following content.

A number of different odor sample data is collected to form a covariance matrix with n rows and m columns, where n is a dimension of the collected data and m is a number of odor samples.

Eigenvalues and eigenvectors of the covariance matrix are calculated.

Eigenvectors of q dimensions with largest eigenvalues are selected to form a projection matrix of q rows and m columns.

A classification model is trained with data features obtained by multiplying each odor feature by the projection matrix. Here, the odor feature of each odor refers to sample data collected for each odor, which is a data matrix with n rows and 1 column.

collecting data of the odor to be identified so as to be input into the trained classification model to obtain the category information.

Preferably, a value of n is 8, and a value of q is 3.

As a preferred embodiment, the classification model is a BP ANN (Back Propagation Neural Network) model.

As a preferred embodiment, a step where the classification model is trained specifically includes following content.

Weights and thresholds between different layers of the BP ANN model are set as a random floating-point number between −1.0 and 1.0.

An error between an output value of an output layer node and a target value is calculated by using derivative of a Sigmoid function.

Weights between nodes in respective layers and thresholds of nodes in a hidden layer and the output layer are corrected according to Widrow and Hoff correction learning rules until the BP ANN reaches a fitted state.

Specifically, the number of different odor sample data is collected by an electronic nose system. The electronic system includes a sensor array unit, a signal preprocessing unit and a pattern recognition unit. The category information refers to a category that a trained process in the pattern recognition unit predicts it belongs to or a category with optimal matching in a trained data set. A training process refers to a process that the electronic nose system needs to be trained before it performs identification, that is, a process of using known odor categories and their characteristics for classification. Taking a process of identifying a fruit odor as an example, training steps are as follows.

Firstly, four different fruits were selected to collect odors to be analyzed through a gas collection chamber. The gas collection chamber is a closed space, which can guarantee constant odor concentration, no ease of odor emission and other features.

Through the odor sensor array unit and the signal preprocessing unit, collected four different odor sample data are formed into a matrix with 8 rows and 4 columns, and eigenvalues and eigenvectors of the covariance matrix are calculated.

Eigenvectors of three dimensions with largest eigenvalues are selected to form a transformation matrix, so as to obtain a projection matrix with three rows and four columns.

The BP ANN is then trained with data features obtained by multiplying each odor feature by the projection matrix.

After training, when it is necessary to identify one of the fruit odors, the trained BP ANN model is used to predict so as to output a fruit name with highest fitting degree.

For the step S2, the demand information of the odor to be identified is determined according to the category information.

Specifically, the demand information of the odor is determined according to the identified odor category. Taking identification of a certain fruit odor as an example, if it is identified as a strawberry odor, demand information related to the strawberry odor will be automatically generated (or manually generated). Relevant demand information can be its own characteristics and related characteristics, including but not limited to special classification, gas composition, odor descriptors, odor color, odor volatility and the like. The demand information can also include specifically more subordinate keywords or phrases. For example, the special classification can include: an aromatic odor, a resin odor, a mint odor, sweetness, a chemical odor, a popcorn burned odor, a lemon odor, a non-orange fruit odor, a pungent odor, a rotten odor, etc.

For the step S3, the corresponding relevant data is collected according to the demand information so as to construct the database.

A step where the corresponding relevant data is collected according to the demand information so as to construct the database specifically includes following content.

Network data is crawled based on nutch theme information. Specifically, a method for crawling the network data based on the nutch theme information includes following steps. Firstly, an initial URL is acquired by Nutch from a seed web page file Seeds.txt, which is then injected into crawldb. A URL set is then acquired to be crawled from the crawldb, so as to create a new segment and generate Fetchlist. When a crawler crawls the webpage, it stores webpage data in the segment, then analyzes its content, extracts a new URL and updates the crawl db. Finally, a new URL set is acquired from the updated crawc, so as to start to crawl the network data.

Crawled network data is processed so as to obtain target information. Specifically, the crawled network data is calculated with a CTPN text detection algorithm, a CRNN text recognition algorithm and a SSD image detection algorithm so as to get the target information.

Finally, the calculated target information is saved to form a database.

For the step S4, the knowledge map centered on odor identification is constructed according to the database.

The knowledge map is constructed as follows. A basic ontology of odor categories is established according to category imagery, the basic ontology of the odor category has a plurality of entities and connection relationships, and the connection relationships can serve to establish different connections according to attributes among entities; and the target information described above is further filled into the basic ontology of product design. Constructing of the knowledge map further includes entity extraction, and the entity extraction further includes entity concept extraction and entity relationship extraction. The extracted entity concepts and entity relationships are filled into the basic ontology of the odor categories to form the knowledge map.

For the step S5, the structured knowledge map is converted into the visual node-link graph.

Figure 2:
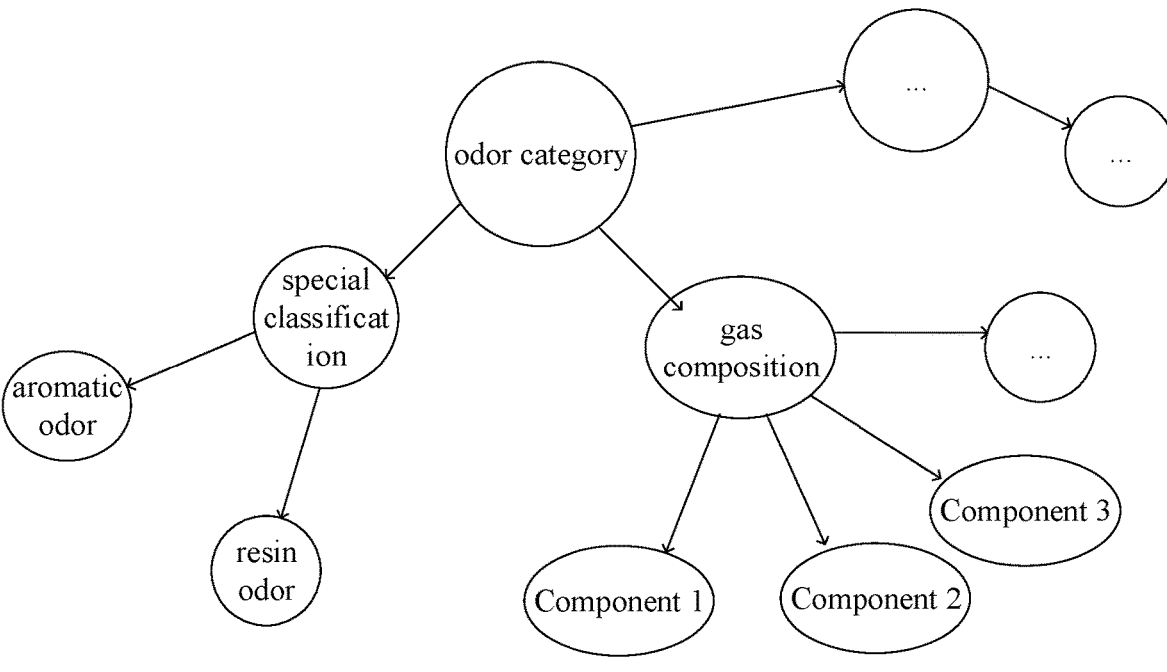
FIG. 2 is a schematic diagram of a node-link graph in the method for odor visual expression based on electronic nose technology according to the present disclosure.

The constructed knowledge map of the odor category is structured data, which needs to be converted into visual expression of the node-link graph. The node-link graph expresses the ontology as interconnected nodes, and edges between the nodes are represented by connecting lines, as shown in FIG. 2. Focus+ context/distortion technique is an expression method for the node-link graph. A node at the focus is a central node (i.e., category information of the odor) and remaining nodes appear around it (i.e., target information). Displayed sizes of associated nodes decreases with a progressive inheritance relationship until they are invisible, and finally a visual knowledge map of the odor category is formed. In visualization of the knowledge map using this technology, specific nodes should be focused for amplification. In this method, room can be made for the focus by distorting a geometric shape of the graph and compressing context areas, so that the nodes that users are interested in can be easily moved to a display center as the focus, so as to display more details while keeping context display of nodes related to the focus.

A system for odor visual expression based on electronic nose technology is further disclosed in this disclosure. The system for odor visual expression based on electronic nose technology can implement the method for odor visual expression based on electronic nose technology described above. Specifically, the system for odor visual expression based on electronic nose technology includes: a data classification unit, an information determination unit, a data acquisition unit, a generating unit and a conversion unit.

The data classification unit is configured to acquire category information of an odor to be identified based on the electronic nose technology. Acquiring category information of the odor to be identified based on the electronic nose technology by the data classification unit specifically includes: collecting a number of different odor sample data to form a covariance matrix with n rows and m columns, where n is a dimension of the collected data and m is a number of odor samples; calculating eigenvalues and eigenvectors of the covariance matrix; selecting eigenvectors of q dimensions with largest eigenvalues to form a projection matrix of q rows and m columns; training a classification model with data features obtained by multiplying each odor feature by the projection matrix; and collecting data of the odor to be identified so as to be input into the trained classification model to obtain the category information. The information determination unit is configured to determine demand information of the odor to be identified according to the category information. The data acquisition unit is configured to collect corresponding relevant data according to the demand information so as to construct a database. The generating unit is configured to construct a knowledge map centered on odor identification according to the database. The conversion unit is configured to convert the structured knowledge map into a visual node-link graph. Specific implementation content of each of the units refers to content disclosed by the method for odor visual expression based on electronic nose technology described above, which is not repeatedly described here again.

A storage medium with executable instructions stored is provided in this disclosure, in which the executable instructions are stored, and when executed by a processor, the executable instructions can cause the processor to execute the method for odor visual expression based on electronic nose technology according to an embodiment of the disclosure. In some embodiments, the storage medium may be a flash memory, a magnetic surface memory, an optical disk, or an optical disk memory. It can also be various devices including one or any combination of memories. In some embodiments, the executable instructions can take forms of programs, software, software modules, scripts or codes, written in any form of programming language (including compiled or interpreted languages, or declarative or procedural languages) and deployed in any form, including being deployed as a stand-alone program or being deployed as a module, component, subroutine or other unit suitable for use in a computing environment. As an example, the executable instructions may, but need not, correspond to files in a file system, and may be stored in a part of files that hold other programs or data, for example, stored in one or more scripts in a Hyper Text Markup Language (HTML) document, stored in a single file dedicated to the program in question, or stored in a plurality of collaborative files (for example, files that store one or more modules, subroutines or code parts). As an example, the executable instructions can be deployed to be executed on one vehicle-mounted computing device, or on multiple computing devices located in one place, or on multiple computing devices distributed in multiple places and interconnected by a communication network.

The basic principles, main features and advantages of the present disclosure are shown and described in the above. It should be understood by those skilled in the industry that the above embodiments do not limit the present disclosure in any form, and all technical solutions obtained by equivalent substitution or equivalent transformation fall within the protection scope of the present disclosure.

The invention claimed is:

1. A method for odor visual expression based on electronic nose technology, comprising:

acquiring category information of an odor to be identified based on the electronic nose technology;

determining a demand information of the odor to be identified according to the category information;

collecting corresponding relevant data according to the demand information so as to construct a database;

constructing a structured knowledge map centered on odor identification according to the database; and converting the structured knowledge map into a visual node-link graph to display its own characteristics, related characteristics, subordinate keywords of the characteristics, and subordinate keywords of the related characteristics, so as to facilitate users to have more intuitive understanding of the odor, wherein the acquiring category information of the odor to be identified based on the electronic nose technology specifically comprises:

collecting a number of different odor sample data in a gas collection chamber by an electronic nose system to form a covariance matrix with n rows and m columns, where n is a dimension of the collected data and m is a number of odor samples, the electronic nose system comprises a sensor array unit, a signal preprocessing unit and a pattern recognition unit, the category information refers to a category that a trained model predicts the odor belongs to in pattern recognition, and the training process refers to a process that the electronic nose system needs to be trained before it performs identification, that is, a process of using known odor categories and their characteristics for classification;

calculating eigenvalues and eigenvectors of the covariance matrix;

selecting eigenvectors of q dimensions with largest eigenvalues to form a projection matrix of q rows and m columns;

training a classification model with data features obtained by multiplying each odor feature by the projection matrix, wherein the odor feature of each odor refers to sample data collected for each odor, which is a data matrix with n rows and 1 column; and collecting data of the odor to be identified so as to be input into the trained classification model to obtain the category information, wherein the demand information comprises odor categories and subordinate keywords of the odor categories; the odor categories comprises special classification, gas composition, odor descriptors, odor color, and odor volatility; the subordinate keywords of the special classification comprises: an aromatic odor, a resin odor, a mint odor, sweetness, a chemical odor, a popcorn burned odor, a lemon odor, a non-orange fruit odor, a pungent odor, and a rotten odor; and the gas composition comprises a first component, a second component, and a third component, wherein the collecting corresponding relevant data according to the demand information so as to construct the database specifically comprises:

crawling network data;

processing crawled network data so as to obtain target information; and saving the calculated target information to form a database, and wherein the processing crawled network data so as to obtain the target information specifically comprises calculating the crawled network data with a Connectionist Text Proposal Network (CTPN) text detection algorithm, a Convolutional Recurrent Network (CRNN) text recognition algorithm and a Single Shot Detector (SSD) image detection algorithm so as to get the target information.

2. The method for odor visual expression based on electronic nose technology according to claim 1, wherein the classification model is a back propagation neural network (BP ANN) model.

3. The method for odor visual expression based on electronic nose technology according to claim 2, wherein training the classification model specifically comprises:

setting weights and thresholds between different layers of the BP ANN model as a random floating-point number between −1.0 and 1.0;

calculating an error between an output value of an output layer node and a target value by using derivative of a Sigmoid function; and correcting weights between nodes in respective layers and thresholds of nodes in a hidden layer and the output layer according to Widrow and Hoff correction learning rules until the BP ANN reaches a fitted state.

4. The method for odor visual expression based on electronic nose technology according to claim 2, wherein a value of n is 8, and a value of q is 3.

5. A non-transitory computer-readable storage medium with computer instructions stored thereon, the computer instructions, when executed by a processor, implementing any of the method for odor visual expression based on electronic nose technology according to claim 1.

* * * * *